United States Patent [19]
Gross

[11] Patent Number: 5,453,866
[45] Date of Patent: Sep. 26, 1995

[54] METHOD AND SYSTEM FOR SENSING A PHYSICAL QUANTITY USING ANALOG OPTICAL SIGNAL TRANSMISSION

[75] Inventor: Walter Gross, Herzogenaurach, Germany

[73] Assignee: Siemens Aktiengesellschaft, Munich, Germany

[21] Appl. No.: 163,201

[22] Filed: Dec. 3, 1993

[30] Foreign Application Priority Data

Dec. 3, 1992 [DE] Germany .................. 42 40 721.4

[51] Int. Cl.⁶ ................................... H04B 10/00
[52] U.S. Cl. .................... 359/144; 359/161; 359/168; 250/551
[58] Field of Search ..................... 359/143, 144, 359/168, 161, 110; 250/227.21, 551; 356/445; 318/729; 62/3.7

[56] References Cited

U.S. PATENT DOCUMENTS

| | | | |
|---|---|---|---|
| 4,290,146 | 9/1981 | Adolfsson et al. | 324/96 |
| 4,295,094 | 10/1981 | Wilreker et al. | 324/96 |
| 4,533,857 | 8/1985 | Chang et al. | 318/729 |
| 4,810,891 | 3/1989 | Maschek et al. | 359/144 |
| 4,838,032 | 6/1989 | Maslaney et al. | 62/3.7 |
| 4,905,309 | 2/1990 | Maisonneuve et al. | 359/144 |
| 4,929,842 | 5/1990 | ter Haserborg et al. | 250/551 |
| 5,119,132 | 6/1992 | Butler | 356/445 |

OTHER PUBLICATIONS

Patent Abstracts of Japan, vol. 4, No. 162 (E–033), Sumitomo Electric Ind Ltd., Dec. 11, 1980, JP55109044, Aug. 21, 1980.

Patent Abstracts of Japan, vol. 9, No. 258 (E–350), Fuji Denki Seizo KK, Oct. 16, 1985, JP60106240, Jun. 11, 1985.

Sensors and Actuators A, 25–27 (1991), pp. 475–480 Walter Gross: *Optical Power Supply for Fiber–optic Hybrid Sensors*.

*Primary Examiner*—Leo H. Boudreau
*Assistant Examiner*—Bhavesh Mehta
*Attorney, Agent, or Firm*—Kenyon & Kenyon

[57] ABSTRACT

A measurement system uses optical of the energy for a sensor and analog optical transmission of the measuring signals of the sensor. A feedback control system sets the working point of the optical transmission system for the measuring signals. A zero measuring signal is provided to an electro-optical signal converter, which outputs a corresponding optical analog signal via a optical transmission line to an optoelectric signal converter. The optoelectric signal converter is adjusted to a predefined analysis signal setpoint when the electro-optical signal converter receives the zero measuring signal via a feedback control system. The manipulated variable of the feedback control system is the working-point current of the electro-optical signal converter, which converts the electrical measuring signals into optical signals. This feedback control system can be used to compensate for interference in the analog transmission. An additional feedback control system, which amplifies the analysis signals into output signals, is provided to correct the gain factor of an amplifier unit.

22 Claims, 5 Drawing Sheets

METHOD AND SYSTEM FOR SENSING A PHYSICAL QUANTITY USING ANALOG OPTICAL SIGNAL TRANSMISSION

BACKGROUND OF THE INVENTION

The present invention relates generally to methods and systems for measuring a physical quantity using a sensor that receives its power via an optical transmission line and that transmits its measurements via an optical transmission line. More particularly, the present invention relates to a method and system for measuring a physical quantity using at least one sensor that converts the physical quantity into an electrical measuring signal, in which the electrical energy for the sensor is transmitted optically from an electro-optical power converter to an optoelectric power converter and from there to the sensor, in which the measuring signals of the sensor are transmitted in an optical analog manner from an electro-optical signal converter to an optoelectric signal converter and there converted into electrical analysis signals, and in which a working-point current is delivered to the electro-optical signal converter in order to set its working point.

Optical transmission systems for transmitting measuring signals between at least one electrical measurement head with a sensor and a base station having an electronic analysis system are preferably used in cases where either high electrical isolation or high electromagnetic compatibility (EMC)* for the transmission link, or both, are required. Examples of such applications include measuring current in high-voltage facilities and measuring EKG respiration and pulse of a patient in magnetic resonance imaging.

*(so called electromagnetic immunity EMI)

Hybrid fiber optic sensor systems in which the measurement head and base station each draw their energy from an electrical power supply unit, and measurement data from the sensor are transmitted via optical fiber from the measurement head to the electronic analysis system, are known. For this purpose, an electro-optical signal converter is provided in the measurement head which converter is supplied with a working-point current for a light-emitting diode (LED) from the power supply unit associated with the measurement head, and which converts the measuring signals into optical signals.

These optical signals are transmitted through a fiber optic bundle or a single optical fiber to an optoelectric signal converter in the base station, and converted back into electrical signals. These electrical signals are generally amplified in an amplifier unit.

If the electrical power supply unit for the measurement head is an external voltage source, electrical lines are required between the voltage source and the measurement head, making sufficient insulation of the measurement head difficult. A battery can therefore be provided in the measurement head as the power supply unit. However, a battery has a limited lifetime and must therefore be replaced regularly. Also known are sensor systems in which electrical energy is obtained from the environment, for example inductively from a power network or with solar energy. However, these energy sources present the problem of insufficient reliability if the current level is zero or the sun is not shining.

In another known hybrid fiber optic sensor system, high insulation and a permanent, reliable energy supply to the measurement head are achieved by the fact that energy for the measurement head, in particular for the sensor and signal converter, is also transmitted optically. For this purpose an optical power source, such as a laser, is provided in the base station, in addition to the electronic analysis system. The optical energy of the optical power source is transmitted via a fiber optic cable to an optoelectric converter in the measurement head, preferably to a specially configured GaAs photoelement array. This converter is then provided in the measurement head as the power supply unit for the sensor and the signal converter. See "Sensors and Actuators A,"25–27 (1991), pp. 475–480.

If analog optical signals are used to transmit the measurement data, the working point of the system (and therefore the measurement data) can be distorted by changes in ambient temperature and by aging phenomena in the electro-optical and optoelectric converters, and by changes in the gain factor and damping in the optical transmission link. For this reason, until now frequency-analog or digital optical signals have been used in the known systems to transmit measurement data. The voltage-frequency converters (VCOs) used to convert analog signals into frequency-analog signals have relatively restricted transmission bandwidths, and require intrinsic energies of approximately 500 mW or more for transmission rates in the MHz range. In addition, the A/D converters which convert analog signals into digital signals are relatively slow, and require considerable intrinsic energy for a desired accuracy of less than 0.1%. By contrast, analog transmission of optical signals has the advantage of a high transmission rate with a large bandwidth as well as a comparatively low energy requirement.

The present invention is directed to the problem of developing a measurement method and a measurement apparatus using analog optical signal transmission in which interference affecting the working point of the transmission system for the measurement data is corrected. In addition, the present invention is directed to the problem of developing such a measurement system and method in which the gain of the measuring signals can be corrected.

SUMMARY OF THE INVENTION

The method of the present invention solves this problem by providing a working-point correction mode for the electro-optical signal converter. The method includes the steps of: (1) applying a zero potential corresponding to a zero measuring signal to the electro-optical signal converter; (2) measuring the analysis signal of the optoelectric signal converter, with the analysis signal constituting a controlled variable, and comparing the analysis signal with a predefined analysis signal setpoint tuned to the zero measuring signal; and (3) modifying the working-point current until the deviation between the analysis signal and the analysis signal setpoint is below a predefined tolerance value.

According to the present invention, in a measurement system with optical transmission of the energy for a sensor and optical analog transmission of the measuring signals from the sensor, a control loop for setting the working point of the signal transmission system is provided in a working-point correction mode. This signal transmission system consists of an electro-optical signal converter that converts the measuring signals into analog optical signals, an optical transmission link for these optical signals, and an optoelectric signal converter that converts the optical signals into electrical analysis signals.

A zero measuring signal is applied to the electro-optical signal converter and the corresponding analysis signal is compared with an analysis signal setpoint. The analysis signal constitutes the controlled variable of a control loop. A working-point current for the electro-optical signal converter is then modified until the system deviation is below a predefined tolerance value. Measurement is repeated in a normal measurement mode using the resulting corrected working point for the electro-optical signal converter and thus for the signal transmission system. The measuring signal from the sensor is then applied to the electro-optical signal converter.

An automatic sequence control system, which preferably institutes a correction of the working point at regular intervals, is preferably provided to switch the feedback control system on and off. The working-point correction mode can also, however, be switched on and off manually.

In a particularly advantageous embodiment, in addition to the control loop in the working-point correction mode, another control loop in a gain correction mode for the gain factor of an amplifier unit is provided. In this amplifier unit, the analysis signals of the optoelectric signal converter are converted into output signals amplified by the gain factor. The gain factor can be less than, equal to, or greater than one. For this purpose, a reference measuring signal is applied to the electro-optical signal converter, and the corresponding output signal, constituting the controlled variable of this second control loop, is compared with a predefined output signal setpoint matched to the reference measuring signal. The gain factor of the amplifier unit, constituting the manipulated variable of this gain control loop, is then modified until the system deviation is below a predefined tolerance value. Once again, an automatic sequence control system and/or a capability for manually switching the feedback control system on and off are preferably provided for this gain correction mode as well.

A preferred embodiment provides for a common sequence control system that institutes first a correction of the working point, and then directly afterward a correction of the gain factor.

DETAILED DESCRIPTION

Figure 1:
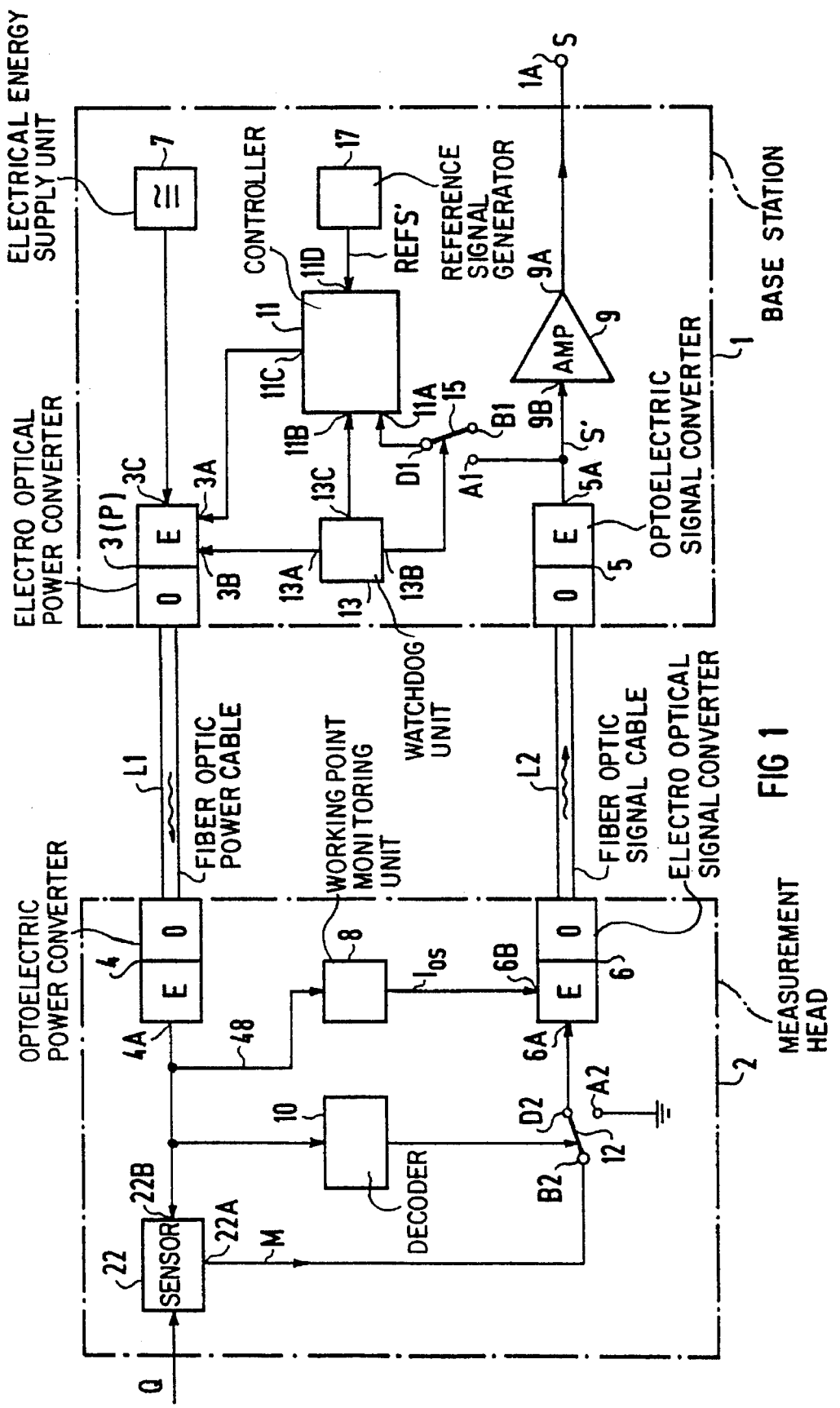
FIGS. 1 and 2 each show an embodiment of an apparatus for measuring a physical quantity, with a control loop for correcting the working point of an optical analog transmission system for the measuring signals of a sensor.

Parts corresponding to one another are given the same reference numbers in the drawing figures. In the embodiments of an apparatus according to the present invention depicted in FIGS. 1 and 2, a base station is designated 1 and a measurement head 2. Base station 1 contains an electro-optical (E/O) power converter 3, an input 3C of which is electrically connected to an electrical energy supply unit 7. Base station 1 also contains an optoelectric (O/E) signal converter 5, an output 5A of which is electrically connected via an amplifier unit 9 to an output 1A of base station 1.

Provided in measurement head 2 is a sensor 22 that converts a physical quantity Q into an electrical measuring signal M that is present at an output 22A of sensor 22. Measurement head 2 also contains an electro-optical (E/O) signal converter 6 that can be connected at an input 6A via a switching device 12 to output 22A of sensor 22. Finally, measurement head 2 also contains an optoelectric (O/E) power converter 4 whose output 4A is connected to an input 22B of sensor 22 to supply electrical energy to sensor 22. The electrical energy for sensor 22 is transmitted optically via a fiber optic power cable L1 from electro-optical power converter 3 in base station 1 to optoelectric power converter 4 in measurement head 2. The two power converters 3 and 4 can also be coupled optically through the air, for example, by means of an appropriate optical transmission system with lasers and lenses and/or mirrors. The measuring signals M of sensor 22 are also transmitted optically via a fiber optic signal cable L2 as analog optical signals from electro-optical signal converter 6 in measurement head 2 to optoelectric signal converter 5 in base station 1. Alternatively, the two signal converters 5 and 6 can also be coupled optically through the air. Optical transmission of both the electrical energy for sensor 22 and the measuring signals M of sensor 22 results in excellent electrical isolation and EMC between base station 1 and measurement head 2. An electrical analysis signal S', generated by conversion of the analog optical signal transmitted via fiber optic signal cable L1, is present at output 5A of optoelectric signal converter 5. This analysis signal S' is converted in amplifier unit 9 into an output signal S that is present at output 1A of base station 1. The gain factor F for the linear gain of analysis signal S' in amplifier unit 9 can be greater than, equal to, or less than one. *)

*) It is understood that the analysis signal S' could also be taken as an unamplified output signal.

For the operation of an optical transmitter section (labeled O) of electro-optical signal converter 6, a predefined working-point current $I_{OS}$ is conveyed to an electrical operating section (labeled E) of said signal converter 6. For this purpose, an input 6B of electro-optical signal converter 6 is connected to a working-point monitoring unit 8.

In the embodiment according to FIG. 1, this working-point monitoring unit 8 is connected to output 4A of optoelectric power converter 4 via an electrical connection 48, and derives the working-point current $I_{OS}$ from the current or voltage at said output 4A.

The current or voltage at output 4A of optoelectric power converter 4 can vary because of changes in the transmission and/or conversion properties of the system. However, this also causes working-point current $I_{OS}$ to fluctuate from its preset value, and the working point of electro-optical signal converter 6—and therefore of the entire transmission system—correspondingly shifts along the characteristic curve of signal converter 6.

According to the present invention, a working-point correction mode with a feedback control system is provided in order to correct this shift in the working point. The system can be switched into this working-point correction mode manually with an open-loop control system, or preferably with an automatic sequence control system in a watchdog unit 13 in base station 1.

Switching device 12 is used to apply a zero signal to input 6A of electro-optical signal converter 6, by creating a connection between a switch contact D2 connected to input 6A and a switch contact A2, at zero potential, of switching device 12.

Simultaneously, switching device 15 in base station 1 is used to apply analysis signal S' to an input 11A of a controller 11, by short-circuiting a switch contact A1 connected to output 5A of signal converter 5 and a switch contact D1 connected to input 11A of controller 11. Watchdog unit 13 also switches on controller 11.

The process control signals which switch switching device 12 are sent from an output 13A of watchdog unit 13 in base station 1 to an input 3B of electro-optical power converter 3. The process control signals are then converted in power converter 3 into modulated optical control signals, and are transmitted via fiber optic power cable L1 to optoelectric power converter 4 in measurement head 2. The process control signals are then converted back into modulated electrical control signals in optoelectric power converter 4. Next, the process control signals are demodulated, in a decoder 10 connected to output 4A of power converter 4, into control signals comprehensible to switching device 12. The process control signals which switch switching device 15 are transmitted directly from an output 13B of watchdog unit 13 to switching device 15. The process control signals which switch controller 11 on and off are transmitted from an output 13C of watchdog unit 13 to an input 11B of controller 11.

The controlled variable of the resulting feedback control system is the analysis signal S' present at output 5A of optoelectric signal converter 5. The reference input variable of the feedback control system is a predefined analysis signal setpoint REFS', which is tuned to the zero signal applied to signal converter 6. This analysis signal setpoint REFS' is stored in a reference signal generator 17 that is connected to an input 11D of controller 11. In controller 11, analysis signal S' is then compared with analysis signal setpoint REFS', and the power output P of electro-optical power converter 3 is modified on the basis of the system deviation REFS' - S'. The actuator of this control loop is thus electro-optical power converter 3, and the manipulated variable is its transmitting power P. Control signals to set this power P are transmitted from an output 11C of controller 11 to an input 3A of power converter 3. A change in the power P of power converter 3 in base station 1 thus directly causes a corresponding desired change in working-point current $I_{OS}$, which is derived by working-point control unit 8 from the current at output 4A of power converter 4 in measurement head 2. This feedback control system is operated until system deviation REFS' - S' is below a predefined tolerance value, and power P is then set definitively to the resulting value.

The system then switches over from working-point correction mode back into measurement mode, by the fact that watchdog unit 13, via decoder 10, switches over switching device 12 to a switch contact B2 with measuring signal M, switches over switching device 15 to a switch contact B1 with zero potential, and finally switches controller 11 off.

Figure 2:
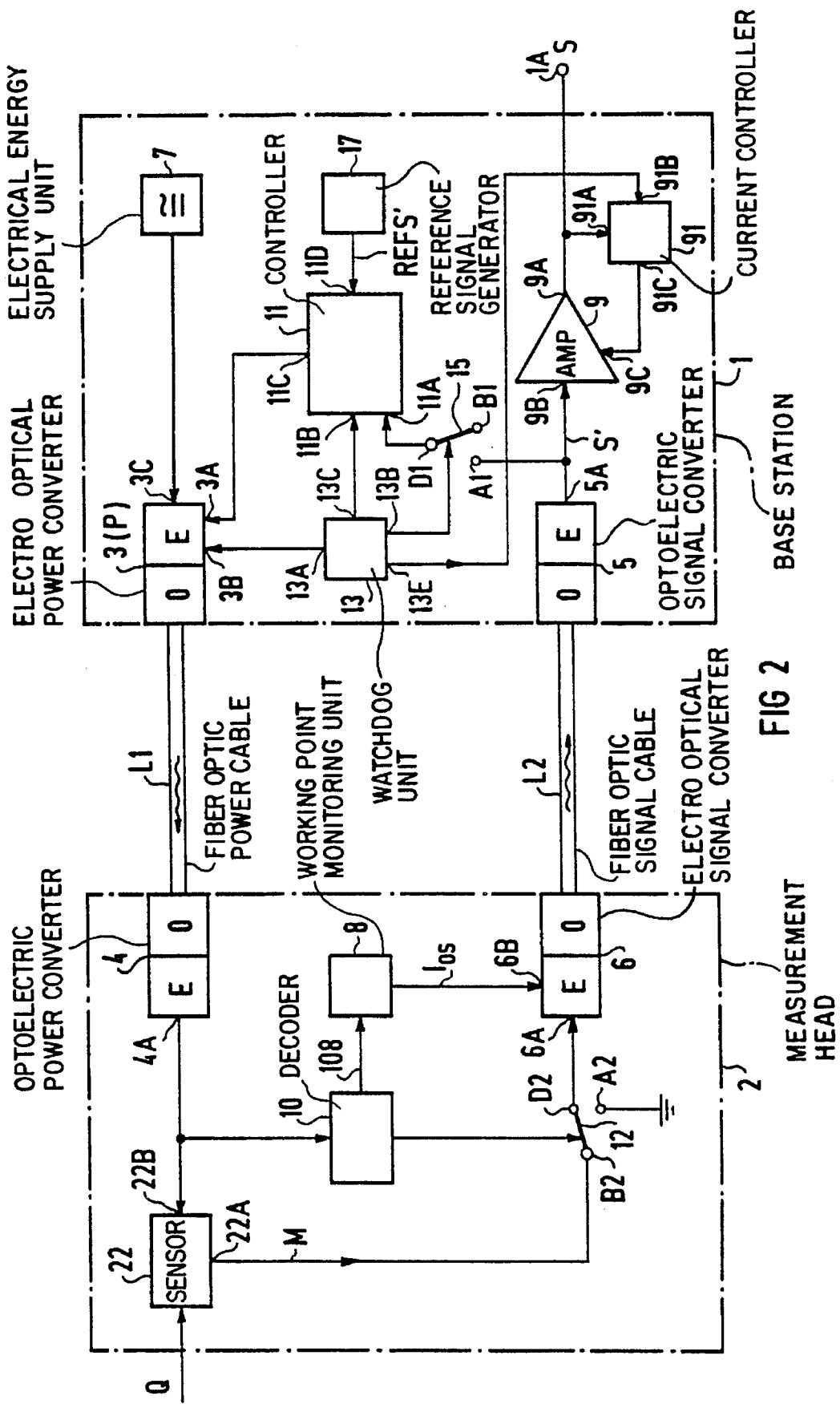

In contrast to the embodiment depicted in FIG. 1, in the embodiment depicted in FIG. 2 electrical connection 48 between working-point monitoring unit 8 and output 4A of power converter 4 is absent. Instead, an additional electrical connection 108 from decoder 10 to working-point monitoring unit 8 is provided, through which a working-point control voltage can be sent from decoder 10 to working-point monitoring unit 8 in order to control working-point point current $I_{OS}$. The control signals needed for this purpose are generated as digital signals by watchdog unit 13 and sent to input 3B of power converter 3, then transmitted as appropriately modulated optical signals via fiber optic power cable L1 from power converter 3 to power converter 4, there converted back into electrical signals, and lastly decoded in decoder 10.

In this embodiment, the manipulated variable of the control loop for working-point correction is therefore not the power P of electro-optical power converter 3, but the working-point current $I_{OS}$ itself. The actuator is working-point monitoring unit 8. On the other hand, the controlled variable in this embodiment is also analysis signal S', and the reference input variable is once again analysis signal setpoint REFS'. However, power converters 3 and 4 with fiber optic power cables L1 between them, and the electrical connection 4A from power converter 4 to decoder 10, are now not part of the controlled system according to FIG. 1, but are provided only in order to transmit actuating signals from watchdog unit 13 to working-point monitoring unit 8, and are therefore part of the actuating system or "servo-drive."

To compensate for interference, such as temperature changes, affecting amplifier unit 9, in an advantageous embodiment a current controller 91 is provided, which is connected at an input 91A to output 9A of amplifier unit 9, at a further input 91B to an output 13E of monitoring device 13, and at an output 91C to a control input 9C of amplifier unit 9. Once working-point correction is complete, this current controller 91 regulates output signal S to zero when output signal S' for the working point—regulated to its setpoint REFS'—is applied to input 9B of amplifier unit 9. For this purpose, current controller 91 delivers a compensation current (constituting the manipulated variable) to amplifier unit 9 via control input 9C. This compensation process for output signal S is instituted by watchdog unit 13 subsequent to working-point correction, but can also be performed manually.

In another embodiment (not depicted), instead of current controller 91 and its connections, a coupling capacitor is inserted upstream from input 9B of amplifier unit 9. This capacitor suppresses the DC voltage component in analysis signal S' for the working point, and allows an AC voltage component to pass unchanged. With pure AC voltage measuring signals, output signal S thus becomes zero when no measuring signal is present.

These two embodiments for setting output signal S to zero when analysis signal S' corresponds to its setpoint REFS' can also be combined with the other embodiments described below, and with the embodiment according to FIG. 3.

Once the working point of the transmission system has been set to its desired value in the working-point correction mode, it is particularly advantageous also to correct the gain factor F of amplifier unit 9. This gain adjustment is especially advantageous if the characteristic curve of the system is nonlinear.

Figure 3:
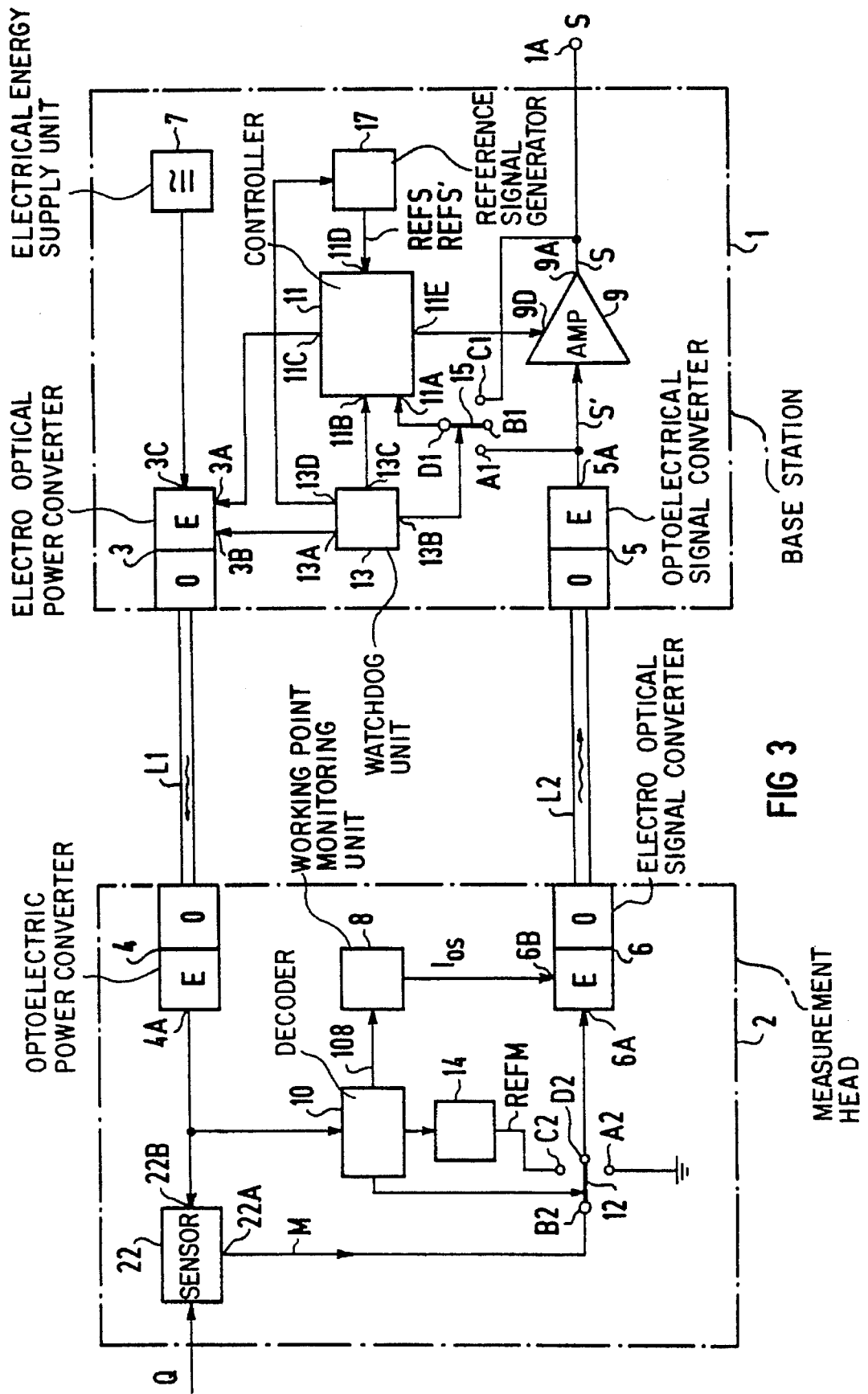
FIG. 3 shows an embodiment of an apparatus for measuring a measurable quantity, with a control loop for correcting the gain factor of an amplifier unit for the signals transmitted in an optical analog manner.

FIG. 3 depicts an embodiment of an apparatus according to the present invention in which, in addition to a first control loop for working-point correction, a second control loop for a gain correction mode is provided. The following features are then provided for this second control loop:

Switching device 15 has, in addition to switch contacts A1, B1, and D1, a further switch contact C1 that is connected to output 9A of amplifier unit 9 and at which output signal S is therefore present. Provided in measurement head 2 is a reference signal generator 14 that is electrically connected to decoder 10. Switching device 12 is provided with an additional switch contact C2 to which a reference measuring signal REFM from reference measuring signal generator can be applied. Of course separate switching devices for working-point correction and gain correction can also be provided. To control the gain factor F, an output 11E of controller 11 is also connected to a control input 9D of amplifier unit 9.

Using appropriate process control signals, watchdog unit 13 causes switching devices 12 and 15 to switch over to switch contacts C2 and C1, respectively. As a result, the reference measuring signal REFM is present at input 6A of electro-optical signal converter 6, and output signal S is present at input 11A of controller 11. At the same time, controller 11 is activated and then compares the output signal S (the controlled variable for this second control loop) with a predefined output signal setpoint REFS that is tuned to the reference measuring signal REFM. In the embodiment depicted, this output signal setpoint REFS is also stored in reference signal generator 17. On the basis of the system deviation REFS - S, controller 11 then adjusts the gain factor F, via control input 9D of amplifier unit 9, until the system deviation REFS - S is below a predefined tolerance value.

With the gain factor F set in this manner, the system is switched back into measurement mode by resetting switching devices 12 and 15 back to switch contacts B2 and B1, respectively, and by deactivating controller 11 and reference measuring signal generator 14.

A control line from an output 13D of watchdog unit 13 to reference signal generator 17 is provided so that analysis signal setpoint REFS' or output signal setpoint REFS can be switched alternatively to input 11D of controller 11.

Preferably a gain correction is performed subsequent to an operation point correction. The embodiments for the gain correction mode can be combined with all embodiments for the working-point correction mode.

Figure 4:
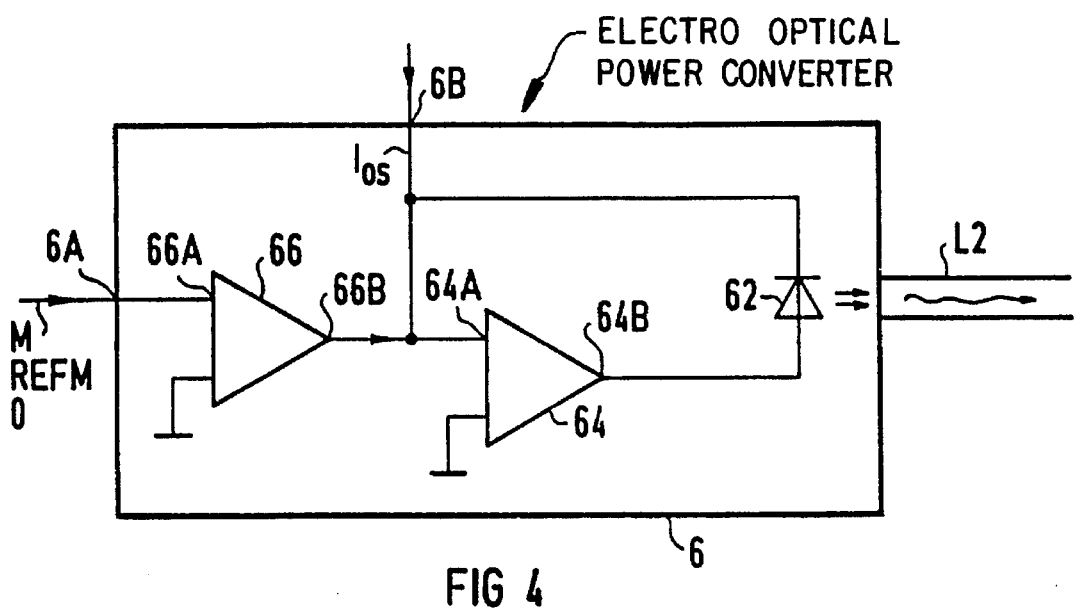
FIG. 4 shows an embodiment of an electro-optical signal converter for transmitting the measuring signals.

FIG. 4 shows an embodiment of electro-optical signal converter 6 in measurement head 2. An LED 62, which is inserted in a feedback loop between an input 64A and an output 64B of an operational amplifier 64, is provided for the transmission of light signals into fiber optic signal cable L2. Also connected to the same input 64A of operational amplifier 64 are input 6B of signal converter 6, which is connected to working-point monitoring unit 8 (not depicted), and an output 66B of a second operational amplifier 66. An input 66A of this second operational amplifier 66 is connected to input 6A of signal converter 6, which delivers a signal, switched via switching device 12, that is identical to the measuring signal M, reference measuring signal REFM, or a zero signal 0. Consequently, an operating current in the feedback loop that operates LED 62, the working-point current $I_{OS}$ from working-point monitoring unit 8, and a signal current, derived in second operational amplifier 66 from the signal voltage at input 66A, from output 66B of this same operational amplifier 66, are added together at input 64A of first operational amplifier 64. Feedback causes the operating current for LED 62 in the feedback loop to be regulated to a value that corresponds exactly to the sum of the working-point current $I_{OS}$ and the signal current from output 66B of operational amplifier 66. In working-point correction mode the signal current is then zero because no measuring signal is present, and the operating current of LED 62 is equal to the working-point current $I_{OS}$.

Figure 5:
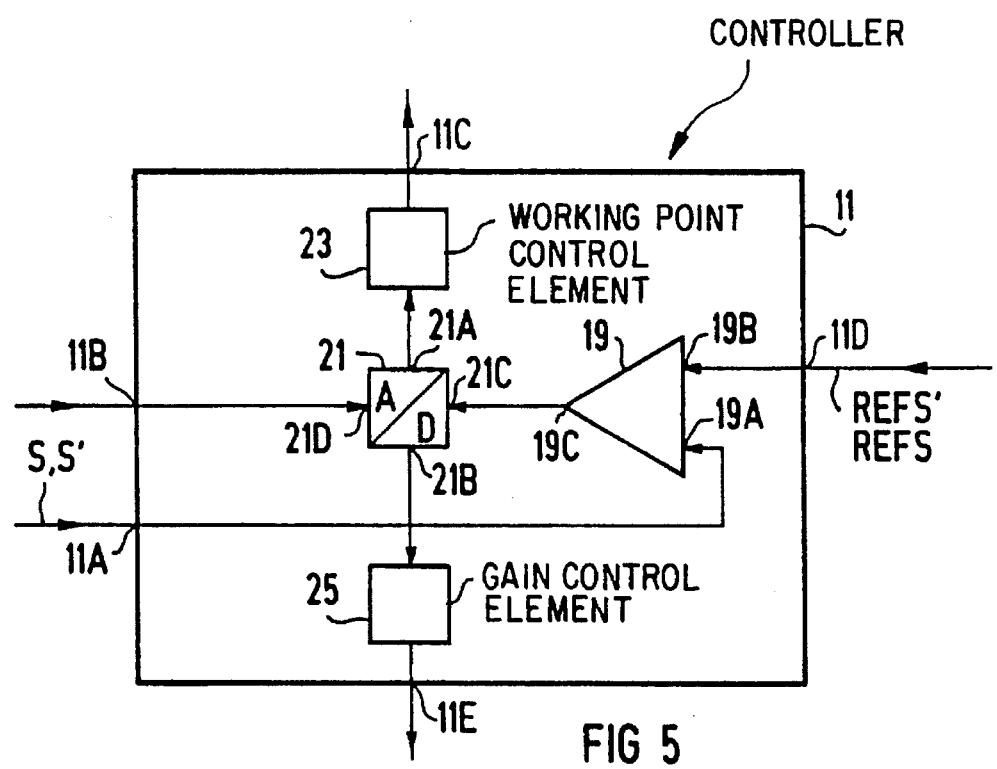
FIGS. 5 and 6 each show an embodiment of a controller for working point and gain correction.

FIG. 5 depicts an embodiment of a controller 11 that can be used for working-point and gain correction, for example in the embodiment according to FIG. 3. Controller 11 contains an analog comparator 19 (for example a differential amplifier), an A/D converter 21, a working-point control element 23, and a gain control element 25. One input 19A of analog comparator 19 is connected to input 11A of controller 11, and the other input 19B of analog comparator 19 is connected to input 11C of controller 11.

In working-point correction mode, analog comparator 19 compares the analysis signal S' present at input 11A and the analysis signal setpoint REFS' present at input 11C, and in gain correction mode correspondingly compares the output signal S and output signal setpoint REFS. The comparison result is delivered, as an analog system deviation (REFS' - S') or (REFS - S) respectively, to an output 19C of analog comparator 19 that is connected to an input 21C of A/D converter 21, and is converted to a digital value in A/D converter 21. The digital system deviation REFS' - S' is sent via an output 21A to working-point control element 23, which derives therefrom a corresponding control signal for direct or indirect adjustment of the working-point current $I_{OS}$ of signal converter 6 and sends it to output 11C of controller 11. The digital system deviation REFS - S is delivered via an output 21B of A/D converter 21 to gain control element 25, which determines therefrom a control signal for adjusting the gain factor F of amplifier unit 9 and sends it to output 11E of controller 11. In this embodiment both the analysis signal setpoint REFS' and the output signal setpoint REFS are stored in analog form in reference signal generator 17 (not depicted).

Figure 6:
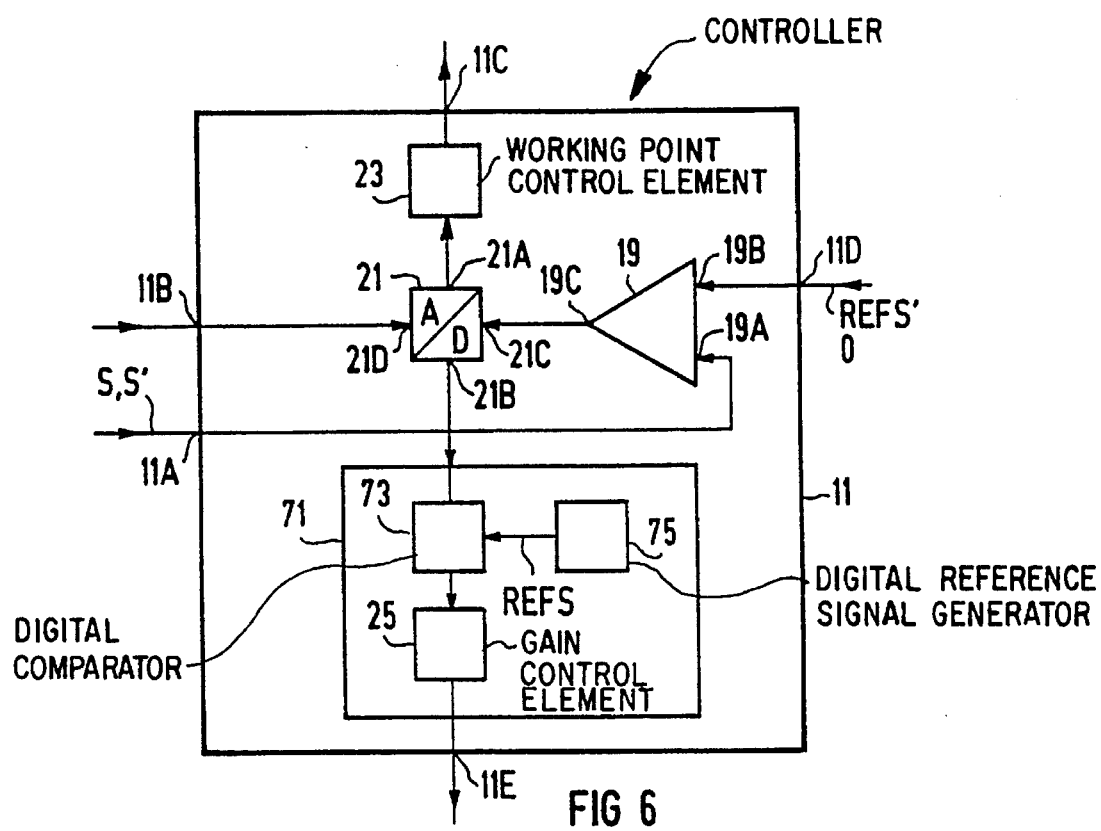

In another embodiment of controller 11 according to FIG. 6, only the analysis signal setpoint REFS' is stored in analog form in reference signal generator 17. Once again the analysis signal S' and analysis signal setpoint REFS' are compared in analog form in analog comparator 19, and the system deviation REFS' - S' is digitized in A/D converter 21 and then delivered to working-point control element 23.

The output signal setpoint REFS, however, is stored in digital form in a digital reference signal generator 75, which is connected to an input of a digital comparator 73. In this digital comparator 73 the output signal S, already digitized in A/D converter 21, is compared in digital form with the output signal setpoint REFS. The resulting digital system deviation REFS - S is delivered to gain control element 25. Digital comparator 73, digital reference signal generator 75, and gain control element 25 together constitute a digital gain controller 71. The output signal S present at input 19A of analog comparator 19 is switched through by analog comparator 19 directly to its output 19C by simultaneously applying a zero signal 0 to its second input 19B.

In an embodiment that is not depicted, it is also conversely possible for the output signal S to be compared in analog form with its output signal setpoint REFS in the analog comparator, while the analysis signal S' is compared in digital form with the analysis signal setpoint REFS' in a digital comparator. Moreover, both the analysis signal S' and the output signal S can be first digitized and then compared in digital form with their setpoints.

Figure 7:
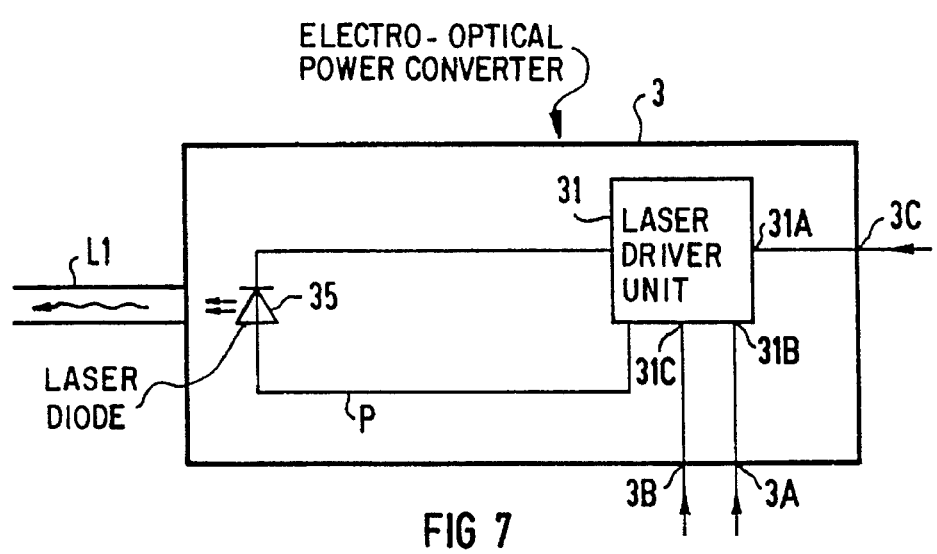
FIG. 7 shows an embodiment of an electro-optical power converter for optical transmission of the energy for a sensor, as well as control signals for the feedback control systems.

FIG. 7 shows an exemplary embodiment of an electro-optical power converter 3 with a laser diode 35 that is connected in a loop in series with a laser driver unit 31. Laser driver unit 31 supplies laser diode 35 with power P. Due to the regulation systems, the maximum power must be set higher than is necessary for the actual energy needs of the sensor. To supply energy, an input 31A of laser driver unit 31 is connected to input 3C of power converter 3, which in turn is connected to energy supply unit 7 (not depicted). Laser driver unit 31 contains a modulator which modulates control signals of controller 11 (not depicted) or watchdog unit 13 (also not depicted) applied to one of its inputs 31B or 31C, respectively, and superimposes them on the power signal. The modulated control signals are emitted by laser diode 35 into fiber optic power cable L1 as modulated optical signals.

In an embodiment that is not depicted, it is also possible to provide a plurality of measurement heads that are powered by the same base station and in which a variety of measurable quantities can be measured. According to the invention, the working points and gain factors of these measurement heads can be set individually.

What is claimed is:

1. A method for measuring a physical quantity comprising the steps of:
  a) in a measurement mode:
    (i) converting the physical quantity into an electrical measuring signal with a sensor;
    (ii) transmitting operating energy for the sensor optically from an electro-optical power converter to the sensor via an opto-electric power converter;
    (iii) converting said electrical measuring signal into an optical analog measuring signal using an electro-optical signal converter;
    (iv) transmitting the optical analog measuring signal to an opto-electric signal converter;
    (v) converting the optical analog measuring signal received at the opto-electric signal converter into an electrical analysis signal; and
    (vi) delivering a working-point current to the electro-optical signal converter to establish a working point of the electro-optical signal converter; and
  b) for correction of the working-point of the electro-optical signal converter, switching into a working point correction mode, which includes the steps of:
    (i) applying a zero potential corresponding to a zero measuring signal to the electro-optical signal converter;
    (ii) measuring the electrical analysis signal of the opto-electric signal converter;
    (iii) comparing the measured electrical analysis signal of the opto-electric signal converter to a predefined analysis signal setpoint tuned to the zero measuring signal; and
    (iv) after said step of comparing, modifying the working-point current until a deviation between the analysis signal of the opto-electric signal converter and the predefined analysis signal setpoint lies below a predefined tolerance value.

2. The method according to claim 1, further comprising the steps of:
  c) providing a sequence control system for the working-point correction mode;
  d) using a sequence control signal to apply the zero measuring signal to the electro-optical signal converter and to switch on and off the feedback control system for the electrical analysis signal; and
  e) transmitting said sequence control signal optically from the electro-optical power converter to the opto-electric power converter.

3. The method according to claim 1, further comprising the step of controlling the working-point current for the electro-optical signal converter in an analog manner by controlling the power of the electro-optical signal converter in an analog manner by controlling the power of the electro-optical power converter.

4. The method according to claim 1, further comprising the steps of:
  c) controlling the working-point current for the electro-optical signal converter with a working-point control signal;
  d) transmitting the working-point control signal as a digital code from the electro-optical power converter to the opto-electric power converter; and
  e) converting the working point control signal in a decoder into an analog control signal.

5. The method according to claim 1, further comprising the step of:
  c) converting the electrical analysis signal into an output signal in an amplifier unit.

6. The method according to claim 5, further comprising the step of:
  c) setting the output signal to zero after the electrical analysis signal has been set to the analysis signal setpoint.

7. The method according to claim 5, including:
  c) a gain correction mode for the amplifier unit, which comprises the steps of:
    (i) applying a predefined reference measuring signal to the electro-optical signal converter; and
    (ii) controlling the output signal of the amplifier unit with a feed-back-control system, which comprises the steps of:
      (1) measuring the output signal of the amplifier unit;
      (2) comparing the output signal controlling the output signal of the amplifier unit to a predefined output signal setpoint tuned to the reference measuring signal; and
      (3) modifying a gain factor of the amplifier unit until a deviation between the output signal of the amplifier unit and the predefined output signal setpoint lies below a predefined tolerance value, wherein the gain factor constitutes a manipulated variable of the feedback-control system for the output signal.

8. The method according to claim 7, wherein the gain correction mode further comprises the steps of:
  (iii) providing a gain sequence control system for the gain correction mode;
  (iv) using a gain sequence control signal to apply the predefined reference measuring signal to the electro-optical signal converter and to switch on and off the feedback control system for the output signal; and
  (v) transmitting said gain sequence control signal optically from the electro-optical power converter to the opto-electric power converter.

9. A system for measuring a physical quantity, comprising:
  a) a measurement head including:
    (i) an opto-electric power converter converting optical energy into electrical energy;
    (ii) a sensor receiving electrical energy from said opto-electric power converter, and converting the physical quantity into an electrical measuring signal;
    (iii) a first switch;
    (iv) an electro-optical signal converter being coupled to the first switch and converting an electrical signal, received at an input into an analog optical signal, wherein said first switch alternatively applies either the electrical measuring signal or a zero measuring signal to the input of the electro-optical signal converter;
    (v) a working-point monitoring unit being coupled to the electro-optical signal converter and providing a working-point current for the electro-optical signal converter; and
  b) a base station including:
    (i) a power supply unit outputting electrical energy;
    (ii) an electro-optical power converter converting the electrical energy provided by the power supply unit into optical energy, and being optically coupled to the opto-electric power converter;

(iii) an opto-electric signal converter being optically coupled to the electro-optical signal converter, receiving the analog optical signal and converting the analog optical signal into an electrical analysis signal;

(iv) a controller adjusting the electrical analysis signal toward a predetermined electrical analysis signal setpoint in a working-point correction mode by adjusting the working-point current provided to the electro-optical signal converter when the zero measuring signal is applied thereto.

10. The system according to claim 9, further comprising:

a) a decoder being coupled to the opto-electric power converter, decoding a first control signal, transmitted optically via the electro-optical power converter to the opto-electric power converter, and triggering the first switch to select the input for the electro-optical signal converter;

b) a reference signal generator being coupled to the controller and generating the predefined analysis signal setpoint for use by the controller;

c) a second switch being coupled between the opto-electric signal converter and the controller; and d) a watchdog unit having a sequence control system for the working-point correction mode, being coupled to the electro-optical power converter, and transmitting the first control signal to the decoder, transmitting a second control signal to the controller to switch the controller on or off, and transmitting a third control signal to the second switch to select a signal to be applied to an input of the controller where said electrical analysis signal may be selected as the input.

11. The system according to claim 9, further comprising an amplifier unit being coupled to the opto-electric signal converter and converting the electrical analysis signal into an output signal.

12. The system according to claim 11, further comprising a current controller having a first input being coupled to an output of the watchdog unit, having a second input being coupled to an output of the amplifier unit, having an output being coupled to a control input of the amplifier, and setting the output signal to zero once the electrical analysis signal has been adjusted to within predefined tolerance from the electrical analysis signal setpoint.

13. The system according to claim 11, further comprising a reference measuring signal generator being disposed in the measuring head, generating a predefined reference measuring signal, and having an output being connectable by the first switch to an input of the electro-optical signal converter, wherein an input of the controller is coupled by the second switch to an output of the amplifier unit at which the output signal is present, whereby the controller, in a gain correction mode, adjusts the output signal toward a predefined output signal setpoint, which is tuned to the predefined reference measuring signal, by setting a gain factor of the amplifier when the predefined reference measuring signal is present at the input of the electro-optical signal converter.

14. The system according to claim 9, further comprising:

a) a fiber optic power cable coupling the electro-optical power converter and the opto-electric power converter to one another; and b) a fiber optic signal cable coupling the electro-optical signal converter and the opto-electric signal converter to one another.

15. An apparatus for electrically isolating a sensor measuring a physical quantity from an analysis system, comprising:

a) an opto-electric power converter being coupled to the sensor and providing electrical power to the sensor;

b) an electro-optical signal converter being coupled to the sensor and outputting an optical analog signal in response to an electrical signal as an input, wherein said electro-optical signal converter is adapted to receive an electrical measurement signal output by the sensor;

c) an electro-optical power converter being coupled to the opto-electric power converter and providing power in optical form to the opto-electric power converter;

d) an opto-electric signal converter being coupled to the electro-optical signal converter and outputting an electrical analysis signal corresponding to the optical analog signal; and e) an operating point control system receiving an operating current from the opto-electric power converter and providing a setpoint current to the electro-optical signal converter based on said operating current, and also receiving the electrical analysis signal from the opto-electric signal converter and controlling the power output of the electro-optical power converter, the operating point control system being adapted to execute an operating current correction mode during which the operating point control system provides a zero measurement signal to the electro-optical signal converter, during which time the system also modifies the power output of the electro-optical power converter until a difference between the electrical analysis signal and a predetermined reference analysis signal lies below a predetermined threshold while the zero measurement signal is being applied to the electro-optical signal converter, then at the time the threshold condition is satisfied, the operating point control system returns the apparatus to a measurement mode by applying the electrical measurement signal from the sensor to the electro-optical signal converter.

16. The apparatus according to claim 15, wherein said operating point control system further comprises:

a) an operating current unit receiving the operating current from the opto-electric power converter and outputting an operating current setpoint to the electro-optical signal converter;

b) a first switch being coupled between the sensor and the electro-optical signal converter, and providing either the electrical measurement signal output from the sensor or the zero measurement signal to the electro-optical signal converter;

c) a decoder receiving a first control signal from the opto-electric power converter, and controlling said first switch, wherein the first control signal causes the decoder to switch the input of the electro-optical signal converter from the electrical measurement signal to the zero measurement signal by controlling said first switch;

d) a controller receiving the electrical analysis signal during the operating current correction mode, having an on/off input, comparing the electrical analysis signal to the predetermined reference analysis signal during the operating current correction mode, and outputting a power output modification signal to the electro-optical power converter during the operating current correction mode; and e) a watchdog timer being coupled to the on/off input of the controller, outputting the first control signal to the opto-electric power converter via the electro-optical power converter during the operating current correction mode, turning the controller on during the operating current correction mode and turning the controller off during a measurement mode, wherein said watchdog timer initiates the operating current correction mode according to a stored program.

17. The apparatus according to claim 16, wherein the operating point control system further comprises a second switch disposed between an output of the opto-electric signal converter and an input to the controller, wherein said second switch is controlled by the watchdog timer and switches the electrical analysis signal from the output of the opto-electric signal converter to the input of the controller during the operating current correction mode.

18. The apparatus according to claim 15, further comprising an amplifier receiving the electrical analysis signal from the opto-electric signal converter during the measurement mode and outputting an output signal corresponding to the physical quantity during the measurement mode.

19. The apparatus according to claim 15, wherein said operating point control system further comprises:

a) an operating current unit outputting an operating current setpoint to the electro-optical signal converter, and having an input;

b) a first switch being coupled between the sensor and the electro-optical signal converter, and providing either the electrical measurement signal output from the sensor or the zero measurement signal to the electro-optical signal converter;

c) a decoder receiving a first control signal from the opto-electric power converter, receiving a second control signal from the opto-electric power converter, controlling said first switch and providing an operating voltage to the input of the operating current unit, wherein the first control signal causes the decoder to switch the input of the electro-optical signal converter from the electrical measurement signal to the zero measurement signal by controlling said first switch, and the second control signal causes the decoder to modify the operating voltage being applied to the input of the operating current unit;

d) a controller receiving the electrical analysis signal during the operating current correction mode, having an on/off input, comparing the electrical analysis signal to the predetermined reference analysis signal during the operating current correction mode, and outputting the second control signal to the opto-electric power converter via the electro-optical power converter during the operating current correction mode; and e) a watchdog timer being coupled to the on/off input of the controller, outputting the first control signal to the opto-electric power converter via the electro-optical power converter during the operating current correction mode, turning the controller on during the operating current correction mode and turning the controller off during a measurement mode, wherein said watchdog timer initiates the operating current correction mode according to a stored program.

20. The apparatus according to claim 19; wherein the operating point control system further comprises a second switch disposed between an output of the opto-electric signal converter and an input to the controller, wherein said second switch is controlled by the watchdog timer and switches the electrical analysis signal from the output of the opto-electric signal converter to the input of the controller during the operating current correction mode.

21. The apparatus according to claim 15, further comprising a gain control system receiving the electrical analysis signal from the opto-electric signal converter, outputting an output signal corresponding to the physical quantity during the measurement mode, and regulating output signal to a predetermined setpoint output signal corresponding to a predetermined reference measuring signal at the input of the electro-optical signal converter during a gain correction mode, wherein said gain control system executes the gain correction mode after the operating current correction mode and before the measurement mode.

22. The apparatus according to claim 21, wherein the gain control system further comprises:

a) an amplifier having a gain, receiving the electrical analysis signal from the opto-electric signal converter during the measurement mode and the gain correction mode, receiving a gain correction signal and outputting the output signal; and b) a current controller being coupled to the watchdog timer, receiving the zero output signal from the amplifier during the gain control mode and controlling the gain of the amplifier by modifying the gain correction signal being sent to the amplifier during the gain control mode, wherein the watchdog timer initiates the gain control mode after the operating current correction mode by actuating the current controller, and maintaining the reference measurement signal at the input of the electro-optical converter, whereby the current controller modifies the gain correction signal until the output signal approximates the setpoint output signal within a predetermined tolerance during the gain correction mode.

* * * * *